US011593994B2

(12) United States Patent
Whitman et al.

(10) Patent No.: US 11,593,994 B2
(45) Date of Patent: Feb. 28, 2023

(54) CREATING WORKING BOUNDARIES IN A MULTI-USER ENVIRONMENT

(71) Applicant: KYNDRYL, INC., New York, NY (US)

(72) Inventors: Todd Russell Whitman, Bethany, CT (US); Mauro Marzorati, Lutz, FL (US); Michael Bender, Rye Brook, NY (US); Jeremy R. Fox, Georgetown, TX (US); Sarbajit K Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 126 days.

(21) Appl. No.: 17/089,983

(22) Filed: Nov. 5, 2020

(65) Prior Publication Data
US 2022/0139042 A1 May 5, 2022

(51) Int. Cl.
*G06T 19/00* (2011.01)
*G06T 19/20* (2011.01)
*G10K 11/175* (2006.01)
*H04W 4/024* (2018.01)
*H04W 4/02* (2018.01)

(52) U.S. Cl.
CPC .......... *G06T 19/003* (2013.01); *G06T 19/20* (2013.01); *G10K 11/1752* (2020.05); *H04W 4/023* (2013.01); *H04W 4/024* (2018.02)

(58) Field of Classification Search
None
See application file for complete search history.

(56) References Cited

U.S. PATENT DOCUMENTS

| | | | |
|---|---|---|---|
| 9,798,933 B1* | 10/2017 | Meisser | H04N 5/232935 |
| 10,412,412 B1* | 9/2019 | Waggoner | H04N 19/109 |
| 10,503,351 B2* | 12/2019 | Gullicksen | G06F 3/017 |
| 10,535,199 B1 | 1/2020 | Bond et al. | |
| 10,553,029 B1* | 2/2020 | Waggoner | G06F 3/0488 |
| 10,553,034 B2* | 2/2020 | Chapman | H04N 21/84 |
| 10,743,003 B1* | 8/2020 | Waggoner | H04N 21/234327 |
| 10,743,004 B1* | 8/2020 | Waggoner | H04N 19/46 |
| 2002/0188678 A1* | 12/2002 | Edecker | H04L 67/131 709/204 |

(Continued)

OTHER PUBLICATIONS

Andersen et al., "Augmented Reality Concentration Cubicle," IP.com No. IPCOM000249206D, IP.com Electronic Publication Date: Feb. 9, 2017, 6 pages.

(Continued)

*Primary Examiner* — Martin Mushambo
(74) *Attorney, Agent, or Firm* — John Kennel; Andrew M. Calderon; Calderon Safran & Cole P.C.

(57) ABSTRACT

A computer-implemented method prevents physical interference between co-located users in virtual environments. The method includes identifying a first user associated with a first virtual reality (VR) system and a second user associated with a second VR system. The method also includes predicting a future movement of the first user to perform a first task in a primary virtual environment. The method further includes identifying, in response to the predicting the future movement of the first user, a first physical space needed for the first user. The method includes determining, in response to identifying the first physical space, a likely interference in a first physical location of the first user. The method also includes preventing the likely interference.

20 Claims, 5 Drawing Sheets

(56) References Cited

U.S. PATENT DOCUMENTS

| | | | | |
|---|---|---|---|---|
| 2012/0015699 | A1* | 1/2012 | Kalvachev | H04L 67/131 463/1 |
| 2012/0315987 | A1* | 12/2012 | Walling | A63F 13/32 463/31 |
| 2013/0217489 | A1* | 8/2013 | Bronstein Bendayan | A63F 13/60 463/31 |
| 2015/0024368 | A1* | 1/2015 | King, Jr. | G09B 5/02 434/365 |
| 2016/0300160 | A1* | 10/2016 | Klein | H04W 8/005 |
| 2017/0045941 | A1* | 2/2017 | Tokubo | A63F 13/25 |
| 2017/0101093 | A1* | 4/2017 | Barfield, Jr. | G08G 1/164 |
| 2017/0205892 | A1 | 7/2017 | Petrovskaya et al. | |
| 2017/0270711 | A1* | 9/2017 | Schoenberg | G06T 19/006 |
| 2017/0364153 | A1* | 12/2017 | Kazansky | G06F 3/011 |
| 2017/0372499 | A1* | 12/2017 | Lalonde | G02B 27/017 |
| 2018/0005429 | A1* | 1/2018 | Osman | G06T 19/006 |
| 2018/0039341 | A1* | 2/2018 | Du Bois | G06F 3/017 |
| 2018/0060333 | A1* | 3/2018 | Bosch | H04L 67/38 |
| 2018/0075309 | A1* | 3/2018 | Sathyanarayana | G06V 40/20 |
| 2018/0095529 | A1* | 4/2018 | Tokubo | A63F 13/25 |
| 2018/0190027 | A1 | 7/2018 | Yao et al. | |
| 2018/0200629 | A1* | 7/2018 | Gillespie | A63F 13/58 |
| 2018/0217679 | A1* | 8/2018 | Kwon | G06F 3/167 |
| 2018/0322700 | A1* | 11/2018 | Carr | G06F 16/29 |
| 2018/0348854 | A1* | 12/2018 | Powers | G06T 7/50 |
| 2018/0373412 | A1 | 12/2018 | Reif | |
| 2019/0043214 | A1* | 2/2019 | Chilcote-Bacco | G06T 19/006 |
| 2019/0227312 | A1* | 7/2019 | Lai | G02B 27/017 |
| 2019/0329129 | A1* | 10/2019 | Fajt | A63F 13/57 |
| 2020/0134298 | A1* | 4/2020 | Zavesky | H04N 7/157 |

OTHER PUBLICATIONS

Lee et al., "Partitioning open-plan workspaces via augmented reality." Personal and Ubiquitous Computing, pp. 1-16, Octt. 2019, https://doi.org/10.1007/s00779-019-01306-0.

Anonymous, "System for optimizing space utilization in virtual reality arenas," IP.com No. IPCOM000243916D, IP.com Electronic Publication Date: Oct. 28, 2015, 6 pages.

Anonymous, "Method for preventing non-VR users from getting hit by VR users." IP.com No. PCOM000255676D, IP.com Electronic Publication Date: Oct. 9, 2018, 3 pages.

Anonymous, "Method and System for Coordinating Movement between Virtual Reality (VR) Objects and Physical Objects," IP.com No. IPCOM000260199D, IP.com Electronic Publication Date: Oct. 31, 2019, 4 pages.

Meetinvr, https://meetinvr.com/, website, printed Aug. 31, 2020, 8 pages.

Strange, "5 VR safety tips to stop you from destroying your home", Mashable, Dec. 31, 2016, 16 pages. https://mashable.com/2016/12/31/vr-headset-safety-tips/.

Metz, "Howto Avoid Real Objects While in a Virtual World", MIT Technology Review, Jun. 12, 2015, 2 pages. https://www.technologyreview.com/2015/06/12/11221/how-to-avoid-real-objects-while-in-a-virtual-world/.

Tarr et al., "Synchrony and social connection in immersive Virtual Reality", Scientific Reports, Published, Feb. 27, 2018, 8 pages. https://www.nature.com/articles/s41598-018-21765-4.

Mell et al., "The NIST Definition of Cloud Computing", Recommendations of the National Institute of Standards and Technology, Special Publication 800-145, Sep. 2011, 7 pages.

* cited by examiner

CREATING WORKING BOUNDARIES IN A MULTI-USER ENVIRONMENT

BACKGROUND

The present disclosure relates to virtual environments, and, more specifically, to creating working boundaries in a multi-user environment.

In multi-user working environments, such as an office, multiple co-located people will be working together and/or in close proximity to one another, and engaged in different activities. The co-located personnel can unintentionally interfere with each other in the co-located space.

SUMMARY

Disclosed is a computer-implemented method to prevent physical interference between co-located users in virtual environments. The method includes identifying a first user associated with a first virtual reality (VR) system and a second user associated with a second VR system. The method also includes predicting a future movement of the first user to perform a first task in a primary virtual environment. The method further includes identifying, in response to the predicting the future movement of the first user, a first physical space needed for the first user. The method includes determining, in response to identifying the first physical space, a likely interference in a first physical location of the first user. The method also includes preventing the likely interference. Further aspects of the present disclosure are directed to a system and a computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
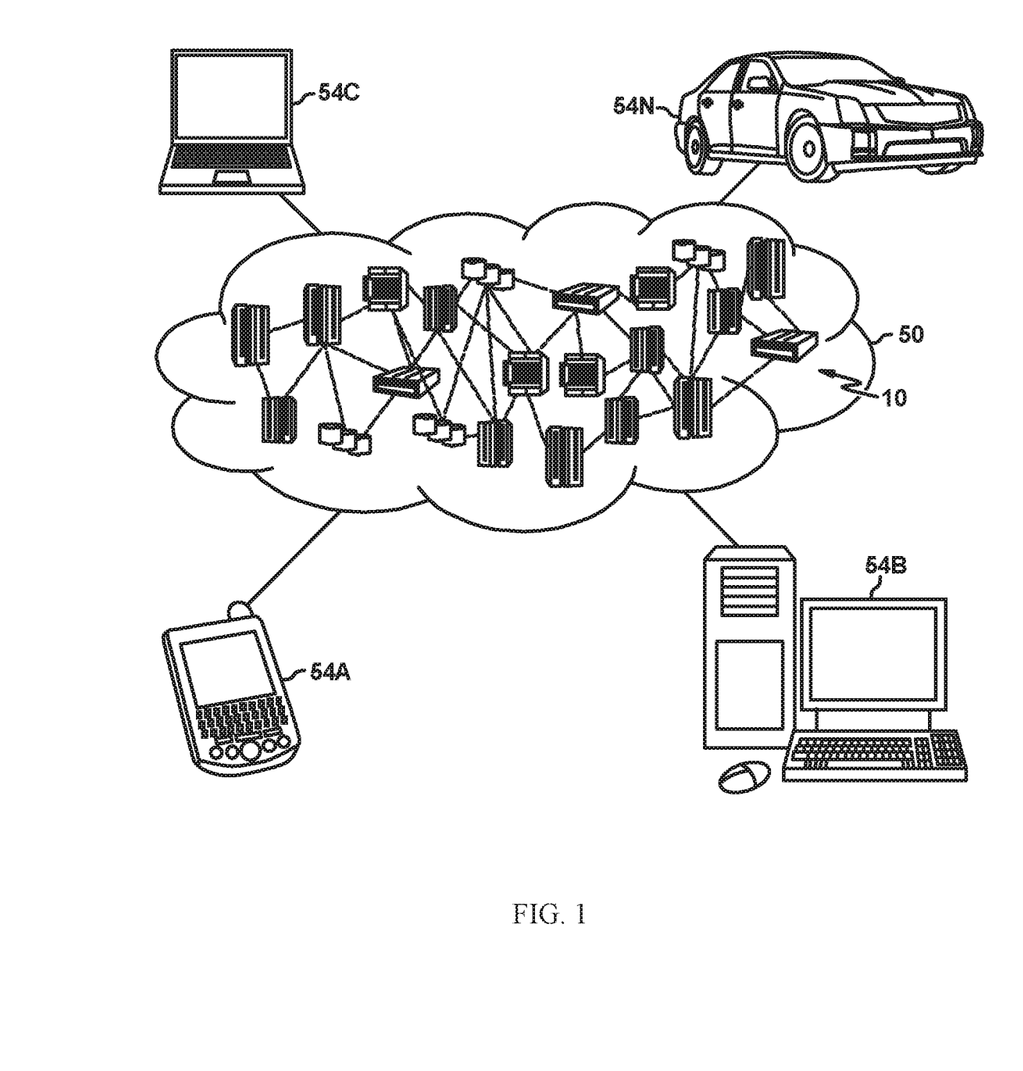
FIG. 1 depicts a cloud computing environment according to embodiments of the present disclosure.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
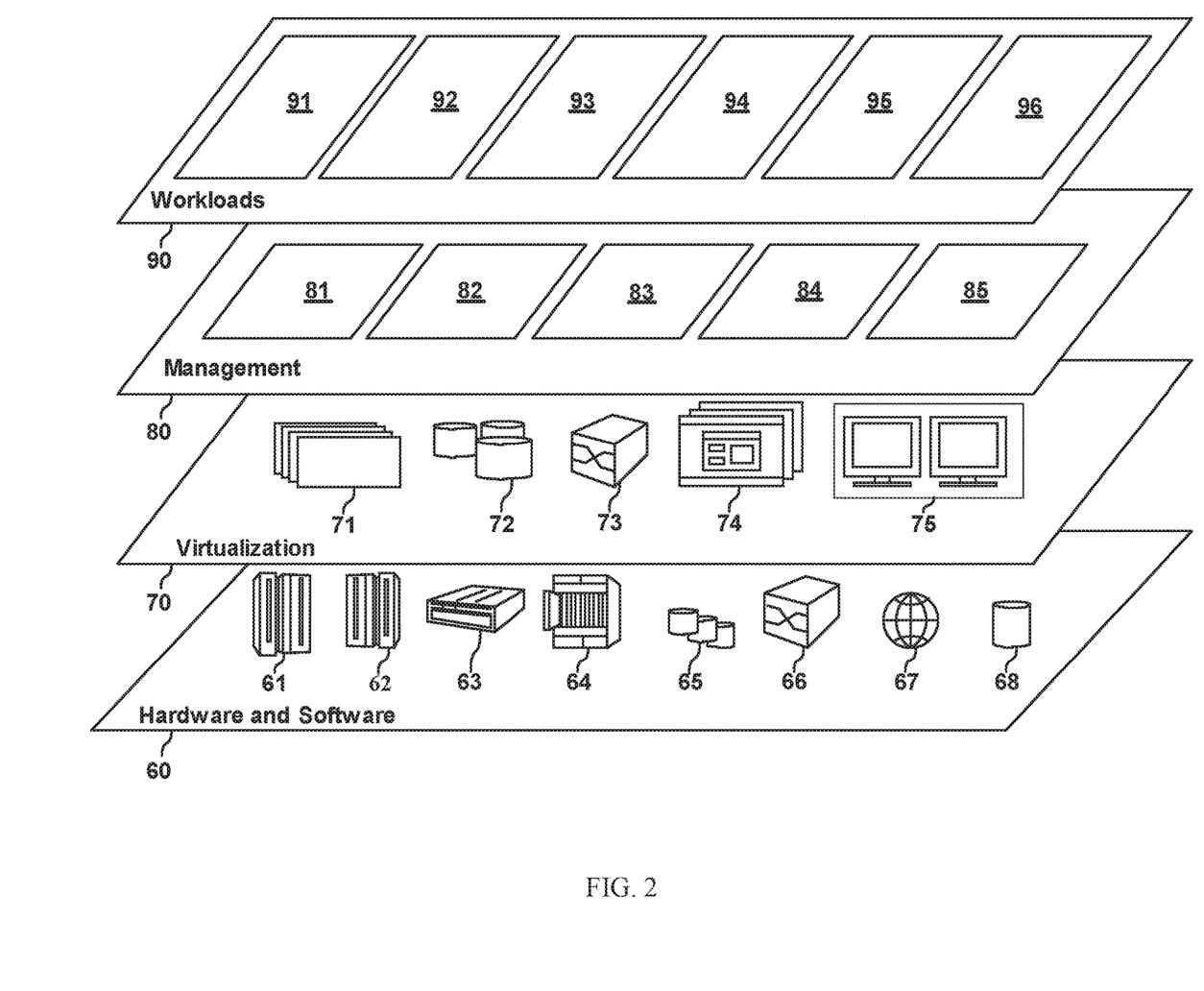
FIG. 2 depicts abstraction model layers according to embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual reality systems 96.

Data Processing System in General

Figure 3:
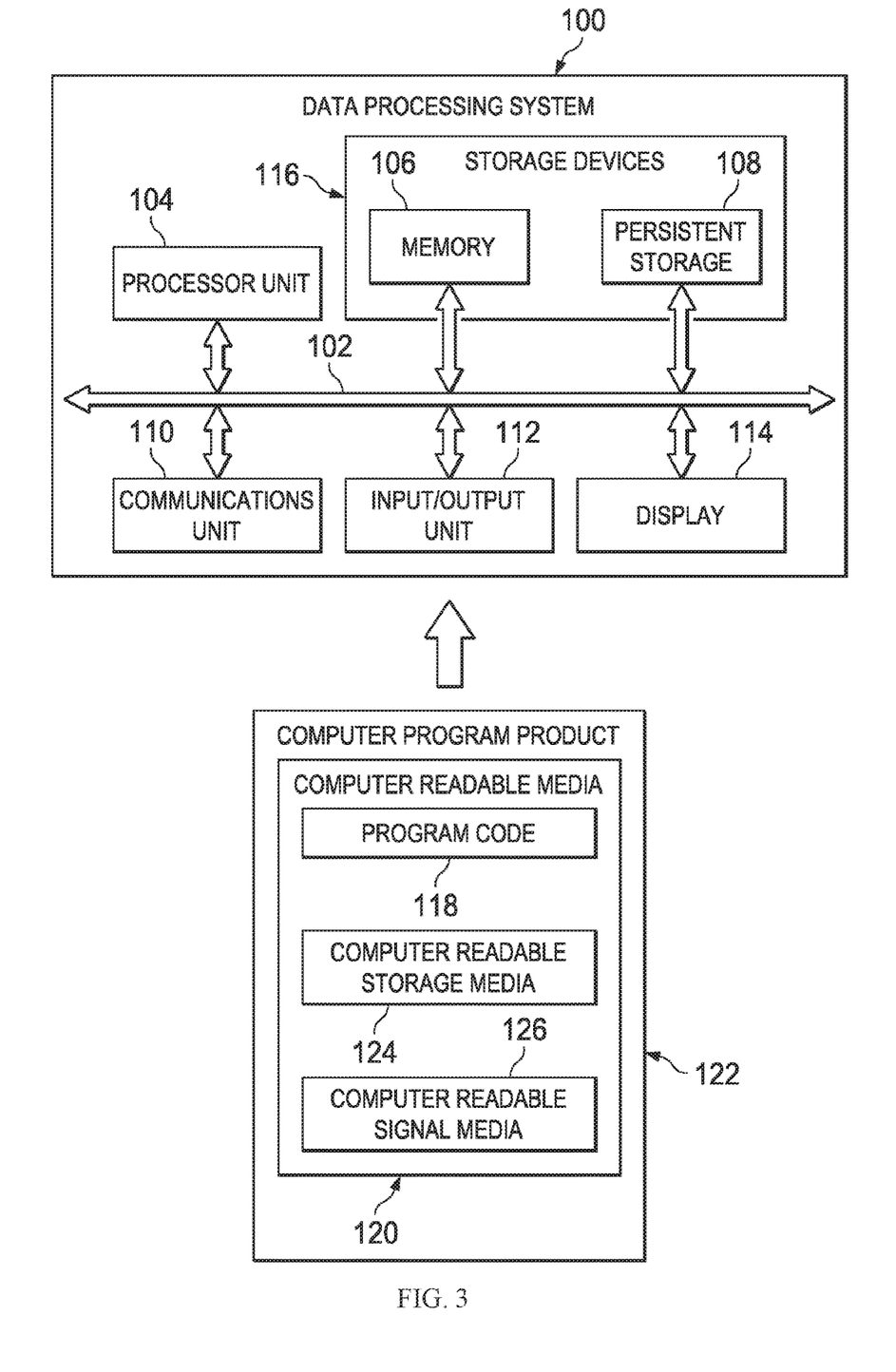
FIG. 3 is a block diagram of a DPS according to embodiments present disclosure.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Virtual Working Boundaries

In multi-user working environments, like an office, multiple co-located people will be working together and/or in close proximity to one another, and engaged in different activities. Each action (e.g., movement, speaking, etc.) by one person can potentially interfere with the actions/activity of the surrounding persons. This can occur in both a physical space, a virtual space, and/or a combination of the two. The interference can be physical interference (e.g., bumping into another person/object), auditory, and/or other. For example, if a first and a second co-located person are working in a common physical space but a different virtual space, then each respective virtual rendering may not include the person and peripherals (e.g., chairs, desks, tools, etc.) of the other person creating a risk of a physical contact between the two persons in the physical space. Additionally, each person may be speaking or using other auditory devices that can be heard in the physical space of the other person, thereby distorting and/or confusing the physical space and virtual space.

Embodiments of the present disclosure include a virtual reality (VR) system that can dynamically design and create and update a virtual interface to prevent unwanted interference with co-located persons. VR is a simulated experience that allows a user to appear to the user as if they are physically present in the rendered environment.

Embodiments of the present disclosure include a VR manager. The VR manager can include and/or be communicatively connected to one or more VR systems. Each VR system can render a virtual interface for a user. The virtual interface allows the user to interact with objects and/or persons in the virtual environment. The VR systems can be coordinated for a single rendered reality (e.g., two or more persons working together in a single virtual environment) or two or more separate realities (e.g., two or more physically co-located persons working in separate virtual spaces). In some embodiments, the VR manager can coordinate each VR system. In some embodiments, the coordination can include ensuring each user has adequate physical and/or virtual space to effectively use the virtual environment without interfering or being interfered by others in the physical or virtual space.

In some embodiments, the VR manager identifies one or more users using a VR system. At least one of the one or more users can be co-located in the physical or virtual space with another person. In some embodiments, the VR manager can determine a physical space needed by a user to perform tasks associated with a VR. VR and virtual environment (VE) can be used interchangeably. In some embodiments, the VR manager identifies the physical space needed by predicting potential actions to be performed by the user. The potential actions can include movement, auditory, and/or other actions. In some embodiments, the predictions can be based on the virtual environment (e.g., which virtual program is being used), the number of persons in the virtual environment, the number of persons in the physical environment, the users history, and/or other similar factors. For example, if a user is using a virtual meeting room, the predicted physical movements may include arm movement, but the predicted auditory actions can be a lot of talking. In some embodiments, machine learning models (or learning models) can be used to predict potential actions of the users. In some embodiments, the VR manager can predict audio/audible actions to be performed by the user. The same/similar factors can be used to predict audible actions.

In some embodiments, each VR system identifies potential interference. Identifying the interference can include identifying object in the physical space of each user. A variety of sensors (e.g., cameras, RFID, etc.) can be used to identify the location of the object. In some embodiments, identifying the interference includes identifying auditory interference. Identifying auditory interference can include the potential sounds from the user or co-located users. It may also include identifying capabilities to reduce auditory interference, such as noise cancellation technology.

In some embodiments, the VR manager incorporates Internet of Things (IoT) technology. The IoT can be used to predict potential movements, track movement, and/or identify potential interference. In some embodiments, the VR manager utilizes 5G technology to facilitate participant fine motions and body movement.

In some embodiments, VR manager can render a primary and a secondary (tertiary, etc.) virtual environment. The primary virtual environment can be the environment in which the user will accomplish a goal for using the virtual environment. For example, if the goal is a meeting, then the primary environment can be a meeting room. A secondary environment can be a portion of the virtual environment configured to allow the user to navigate to a physical space void of interferences and/or prevent navigation to a space with interferences. For example, if two users need to move apart in a physical environment, a virtual door and hallway may open and allow one user to move to a different virtual room. The hallway can be the secondary virtual environment.

The aforementioned advantages are example advantages, and embodiments exist that can contain all, some, or none of the aforementioned advantages while remaining within the spirit and scope of the present disclosure.

Figure 4:
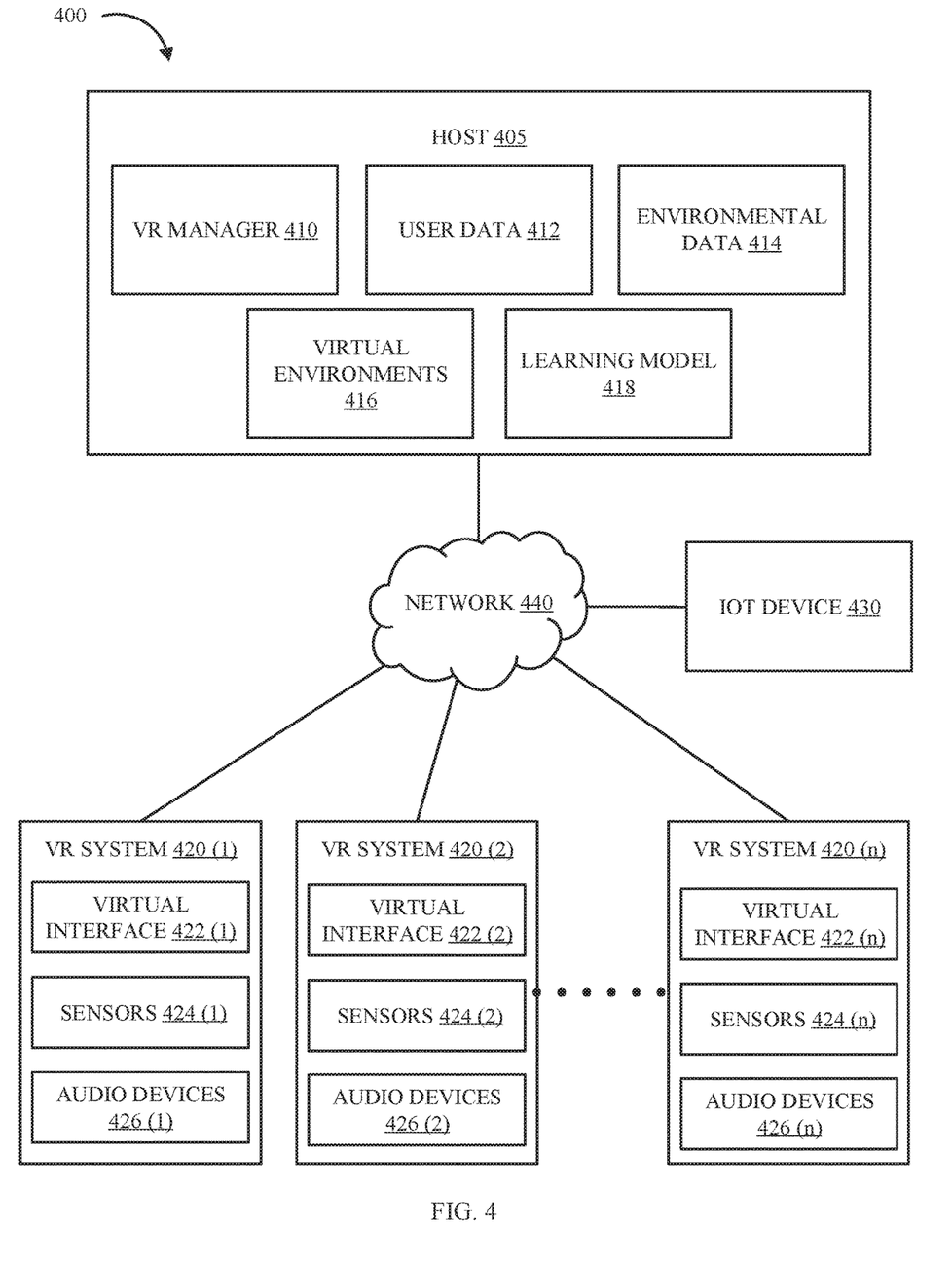
FIG. 4 is a functional diagram of a computing environment suitable for operation of a VR manager according to embodiments of the present disclosure.

Referring now to various embodiments of the disclosure in more detail, FIG. 4 is a representation of a computing environment 400, that is capable of running a VR manager and one or more VR systems in accordance with one or more embodiments of the present disclosure. Many modifications to the depicted environment may be made by those skilled in the art without departing from the scope of the disclosure.

Computing environment 400 includes host 405, VR system 420 (1), VR system 420 (2), through VR system 420 (n) where n is an integer, IoT device(s) 430 and network 440. VR system 420 (1), VR system 420 (2), through VR system 420 (n) will be referred to as VR system 420 collectively and/or individually. In some embodiments, host 405, and/or VR systems 420 may include a computer system, such as the data processing system 100. In some embodiments, host 405, and VR systems 420 are included in the same computing device; however, they are shown as separate for discussion purposes.

Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between host 405, VR system 420, IoT devices 430, and other computing devices (not shown) within computing environment 400. In some embodiments, network 440 includes 5G capability. 5G is a wireless technology with data transfer speed that can range from about 50 Megabits per second to over a gigabit per second.

Host 405 can be a standalone computing device, a management server, a web server, a mobile computing device, or any other electronic device or computing system capable of receiving, sending, and processing data. In other embodiments, host 405 can represent a server computing system utilizing multiple computers as a server system, such as in cloud computing environment 50. In some embodiments, host 405 represents a computing system utilizing clustered computers and components (e.g., database server computers, application server computers, etc.) that act as a single pool of seamless resources when accessed within computing environment 400. In some embodiments, host 405 includes VR manager 410, user data 412, environmental data 414, virtual environments 416, and learning model 418.

VR manager 410 can be any combination of hardware and/or software configured to manage one or more co-located users in one or more virtual environments. In some embodiments, VR manager 410 can prevent physical and audio interference for the co-located users both in the physical and virtual environments. In some embodiments, VR manager 410 receives and analyses data from one or more of user data 412, environmental data 414, virtual environments 416, learning model 418, IoT devices 430, and VR system 420. In some embodiments, VR manager 410 uses the received data to predict actions of the users, determine if the actions will interfere with other users and/or the physical environment, and use a secondary (tertiary, etc.) virtual environment guide/direct the user to a new physical space. The new physical space can be a location where there is little or no chance of interference. In some embodiments, the secondary virtual environment can be ended/deleted. In some embodiments, VR manager 410 includes user data 412, environmental data 414, virtual environments 416, and/or learning model 418. However, they are depicted as separate for discussion purposes.

User data 412 can be any combination of hardware and/or software configured to determine/identify data related to users. The users can be a user associated with VR system 420. In some embodiments, the user data 412 can include an identifier (e.g., login, account number, email, etc.) for each user. In some embodiments, user data 412 includes historical data for each user. The historical data can include data related to how a user previously utilized VR system 420. For example, the historical data can include which virtual environment 416 have been used, the number of times VR system 420 has been used, previous actions (e.g., speaking, movement), type of collaborations, and other similar data. The historical data can be used to assist in determining future actions of the user.

Environmental data 414 can be any combination of hardware and/or software configured to identify and/or map items and/or persons in a physical environment. In some embodiments, environmental data 414 received data from VR system 420 (e.g., sensors 421). In some embodiments, environmental data 414 utilizes IoT devices 430 to identify objects and their locations. For example, an RFID tag can be attached to a table, and when a sensor identifies the table, its location, and dimensions can be determined. In some embodiments, environmental data can be pre-loaded. For example, layout of office furniture can be uploaded into the environmental data 414.

Virtual environments 416 can be any combination of hardware and/or software configured to generate one or more virtual environments. In some embodiments, the virtual environments are generated for VR system 420. Virtual environments 416 can include any number of environments. For example, some environments can be for meetings (e.g., office space, boards rooms), some environments for training (e.g., hospital setting, chemical plant, wood shop, etc.), some virtual environments for gaming, and so forth. In some embodiments, virtual environments 416 can include primary and/or secondary environments.

In some embodiments, virtual environments 416 includes one or more tasks. Each task can be associated with one or more virtual environments. The task can be a goal/objective of entering the virtual environment. For example, one task may be to conduct/participate in a meeting, while another task can be to navigate through a series of puzzles to reach a predetermined location. The details of the task can assist in determining potential actions for the user, as well as the potential to interfere with other co-located persons.

In some embodiments, learning model 418 can be any combination of hardware and/or software to assist in predicting potential interference for one or more co-located users. In some embodiments, learning model 418 uses machine learning. Learning model 418 can receive a series of inputs, process through one or more layers of nodes, and output a result. The result can be one or more potential interferences. In some embodiments, the result includes an area needed for a user to avoid being interfered with and/or interfering other co-located users. In some embodiments, the result can predict audible actions by one or more users. In some embodiments, learning model 418 can use all the data received by VR manager 410. In some embodiments, learning model 418 can identify likely (e.g., a risk score above a predefined/predetermined threshold) physical and/or audio interference.

In some embodiments, learning model 418 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, the BBSH may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Virtual system 420 can be any combination of hardware and/or software configured to display a virtual environment to a user. In some embodiments, virtual system 420 can be associated with a user. In some embodiments, each virtual system 420 can include the same or a different method functionality. Virtual system 420 can include one or more components. The components can include a visual, tactile, and/or an audio component. The visual component provides a visual interface for the user (e.g. goggles, monitor, etc.). The tactile components can provide an interface for movement of appendages of the user. Virtual system 420 can include virtual interface 422, sensors 424, and audio devices 426.

Virtual system 420(1) can include virtual interface 422(1), sensors 424(1), and audio devices 426(1). Virtual system 420(2) can include virtual interface 422(2), sensors 424(2), and audio devices 426(2). Virtual system 420(n) can include virtual interface 422(n), sensors 424(n), and audio devices 426(n). Each of virtual interface 422(1)-(n), sensors 424(1)-(n), and audio devices 426(1)-(n) will be referred to as interface 422, sensors 424, and audio devices 426 respectively, both collectively and individually.

Virtual interface 422 can be any combination of hardware and/or software configured to display a visual and/or tactile component of the virtual reality to the user. In some embodiments, virtual interface 422 can provide data to and receive input from the user. The virtual interface can include a screen. The virtual interface can also include one or more devices attached to the appendages of the user. The devices can be communicatively coupled to the visual components. In some embodiments, virtual interface 422 can display primary VR and secondary VR.

Sensors 424 can be any sensors that can identify physical environments of the user. Sensors 424 can include optical (e.g., cameras), infrared, IoT, other VR systems, and other sensors to identify objects in the vicinity of the user.

Audio devices 426 can be any combination of hardware and/or software configured to provide/detect audio for the virtual system. Audio devices 426 can include one or more of microphones, speakers, and/or sound cancellation devices.

IoT devices 430 can be any device configured to communicate across network 440. There can be any number of IoT devices 430, however only one is shown. In some embodiments, each component of virtual system 420 can be an IoT device. In some embodiments, items in the physical environment can be IoT devices. For example, smart chairs, smart clothing, and the like can contribute to predicting future actions and/or determining if a physical environment has adequate space to prevent interference.

Figure 5:
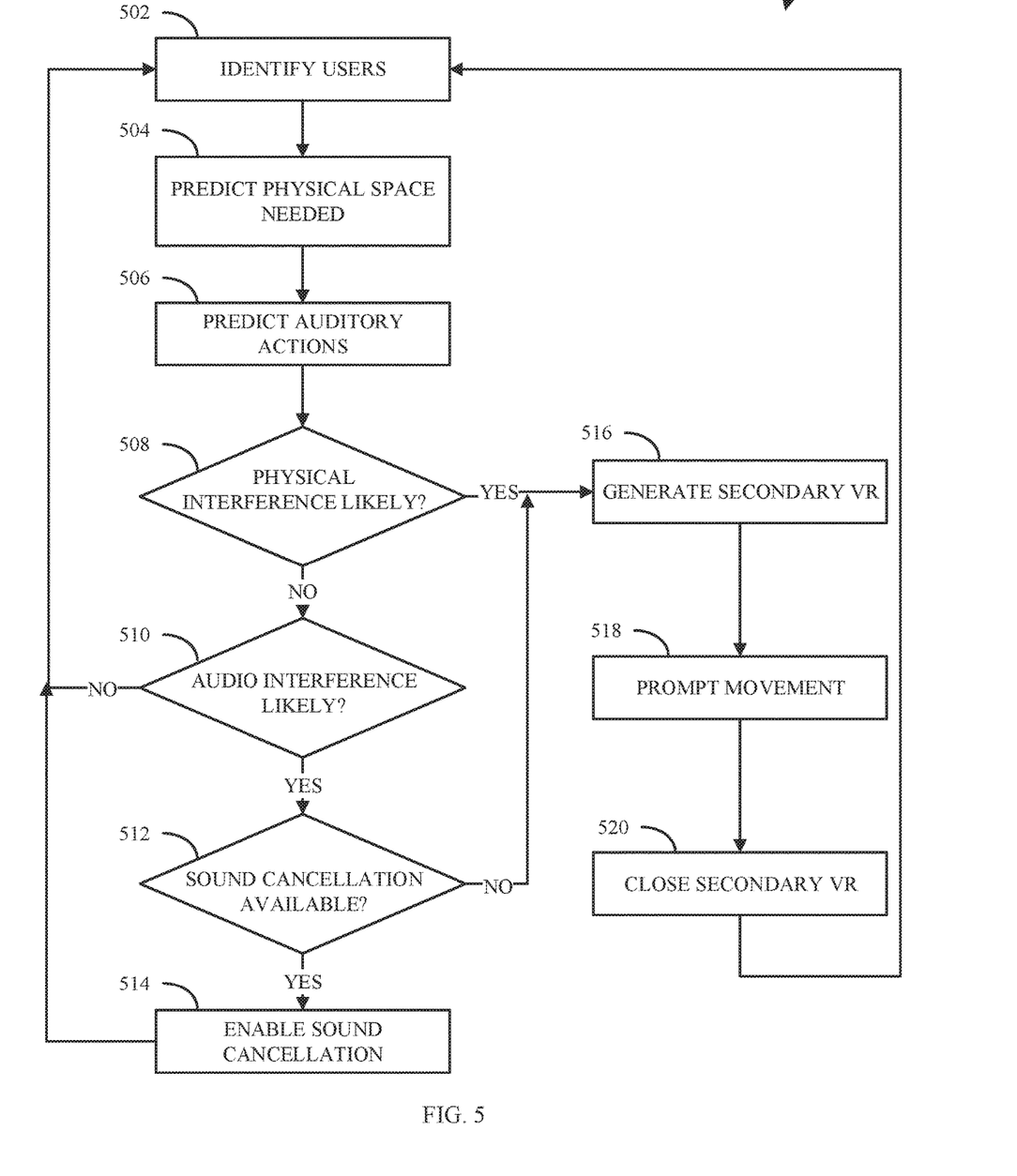
FIG. 5 is a flow chart of an example method to prevent audio and/or physical interference for co-located persons in a virtual environment according to embodiments present disclosure.

FIG. 5 is a flow chart of an example method 500 to create virtual working boundaries and/or prevent virtual and physical interference between co-located users in according to embodiments of the present disclosure. The method 500 can be performed in a computing environment (e.g., computing environment 400 and/or cloud computing environment 50). One or more of the advantages and improvements described above for prevent interference for co-located users in a virtual environment can be realized by method 500, consistent with various embodiments of the present disclosure.

Method 500 can be implemented by one or more processors, host 405, VR manager 410, user data 412, environmental data 414, virtual environments 416, learning model 418, VR system 420, its subcomponents, IoT devices 430 and/or a different combination of hardware and/or software. In various embodiments, the various operations of method 500 are performed by one or more of host 405, VR manager 410, user data 412, environmental data 414, virtual environments 416, learning model 418, VR system 420, its subcomponents, IoT devices 430. For illustrative purposes, the method 500 will be described as being performed by VR manager 410. In some embodiments, method 500 can be performed for one VR system. In some embodiments, method 500 can be performed for two or more VR system simultaneously (e.g., VR manager 410 performs each operation VR system 420 (1) and VR system 420 (2) simultaneously). In some embodiments, the method 500 can be performed for two or VR system concurrently (e.g., VR manager 410 performing a first operation for VR system 420 (1) while performing a second operation for VR system 420(2).

At operation 502, VR manager 410 can identify one or more VR systems. In some embodiments, each VR system (e.g., VR system 420(1)) is associated with a user. In some embodiments, a user is physically co-located with a second user. The user can be located in the vicinity of a physical obstruction (e.g., a table). Each user can be linked to an account. The account can contain data relevant for each user. For example, the data can include past uses of the VR system, types of actions taken, frequency of actions, and other similar data. The account data can be stored in user data 412. Each user can authenticate their identity. The authentication can be by a user name, and/or any other identifier.

In some embodiments, each VR system identified in response to the user authenticating. In some embodiments, each VR system is identified in response to the VR system accessing one or more virtual environments 416. In some embodiments, each VR system is identified in response to VR manager 410 generating/rendering a primary VR. The primary VR is from the point of view of each VR system. Two or more different VR systems can have a common primary VR. For example, two users can collaborate in a single virtual environment.

At operation 504, VR manager 410 determines a physical space needed for each VR system. In some embodiments, the physical space is determined by determining/predicting potential movements of each user. The potential and/or predicted movements can be based on one or more of user data 412, environmental data 414, virtual environments 416, and IoT devices 430. In some embodiments, learning model 418 determines the predicted movements. In some embodiments, determining the physical space includes generating a mobility path for each user. The mobility path can be a path of travel required to accomplish a task associated with the virtual environments. In some embodiments, the physical space can be the space needed to complete one or more tasks. Each task can be associated with a virtual environment In some embodiments, determining the needed physical space includes identifying objects in the physical environment. Identifying the object can include scanning the physical environment of each user. The scanning can be performed by sensors 424. In some embodiments, the object are identified based on IoT devices 430. In some embodiments, the objects are identified based on environmental data 414.

At operation 506, VR manager 410 identifies potential/predicted noise to be generated by each VR system. In some embodiments, the potential and/or predicted noise can be based on one or more of user data 412, environmental data 414, virtual environments 416, IoT devices 430. For example, if the virtual environment is a meeting, then standard volume conversation can be predicted. Another example, if the virtual environment is a high stress video game, the conversation can relatively loud.

At operation 508, VR manager 410 determines if physical interference is likely. In some embodiments, physical interference is likely when the predicted physical space for two or more co-located users overlap. The physical space can overlap the same location is within both physical spaces. In some embodiments, an overlap occurs when the likelihood both users will occupy the same space is above a predetermined threshold. In some embodiments, an overlap can occur when two or more mobility paths cross. In some embodiments, physical interference is likely if an object (e.g., table, chair, wall, etc.) is within the predicted physical space of a user.

If it is determined physical interference is likely (508: YES), then VR manager 410 proceeds to operation 516. If it is determined physical interference is not likely (508:NO), then VR manager 410 proceeds to operation 510.

At operation 510, VR manager 410 determines if audio interference is likely. In some embodiments, audio interference is likely if the determined noise from a user can be heard by a co-located second user. In some embodiments, the determination can be based on one or more of the predicted volume of a user, a distance between the co-located users, and sound blocking objects (e.g., a wall, etc.).

If it is determined physical interference is likely (510: YES), then VR manager 410 proceeds to operation 512. If it is determined physical interference is not likely (510:NO), then VR manager 410 proceeds to operation 502.

At operation 512, VR manager 410 determines if each VR system contains sound cancellation technology. In some embodiments, each VR system can indicate sound cancellation technology. This can be obtained at operation 502. If it is determined sound cancellation technology is available (512:YES), then VR manager 410 proceeds to operation 514. If it is determined sound cancellation technology is not available (512:NO), then VR manager 410 proceeds to operation 516. At operation 514, VR manager 410 enables/initiates sound cancellation. In some embodiments, enabling the sound cancellation is for the co-located user that will be interfered with.

At operation 516, VR manager 410 generates a secondary VR. In some embodiments, the secondary VR can be a temporary virtual space configured to allow physical movement from a first location to a second location. In some embodiments, the secondary VR can be a virtual person to lead, unlocking a virtual door, rendering new space that was previous not visible, etc. In some embodiments, the secondary VR is configured to avoid objects (e.g., chairs), in the secondary VR movement space.

In some embodiments, the secondary VR can be configured to prevent movement into a specified space (e.g., space occupied by a second user). For example, if the first user is navigating a shop floor in their VR and thus physically moving, the secondary VR can be a virtual obstacle/barrier/instruction prevent travel in a specific direction. The virtual barrier can be virtual caution tape, a virtual caution sign, a virtual person giving verbal instructions, etc. In some embodiments, the virtual boundary is linked to a secondary action. The secondary action can be an audible and/or other warning indicating likely interference. For example, a virtual barrier can be a virtual caution tape. When the user passes through the caution tape in the virtual environment, then VR manager can produce another audible warning to stop the user from proceeding in that direction. In some embodiments, the secondary VR can be configured to allow for movement away from the likely interference. For example, if the user is in a first physical location, and there is a likely interference at a second location, the secondary VR can be an obstacle (e.g., caution tape) that prevents movement toward the second location, but does not have an obstacle, and therefore allows movement toward a third physical location.

At operation 518, VR manager 410 prompts movement. In some embodiments, the prompting can be configured to indicate movement to the user. For example, a virtual person can say, "please follow me." Another example, digital arrows can provide directions. A third example, a virtual door can open/unlock to provide a pathway of movement. At operation 520, VR manager 410 ends the secondary VR. In some embodiments, the secondary VR is ended in response to the user traveling to the destination. In some embodiments, VR manager 410 returns to operation 502. The return to operation 502 can include determining if there are any new user and/or any users that have left. In some embodiments, method 500 ends in response to completing operation 520, operation 510 and/or operation 514.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. As another example, the steps in two or more different figures can be combined into a single process and/or co-occurring process It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying a first user associated with a first virtual reality (VR) system and a second user associated with a second VR system;
   predicting a future movement of the first user to perform a first task in a primary virtual environment;
   identifying, in response to the predicting the future movement of the first user, a first physical space needed for the first user;
   determining, in response to identifying the first physical space, a likely interference with the future movement in a first physical location of the first user; and
   preventing the likely interference, wherein the preventing includes rendering a secondary virtual environment configured to allow movement away from the likely interference-by prompting the first user to move to a new physical location.

2. The method of claim 1, wherein determining the likely interference includes generating a path of travel by the second user required to accomplish another task associated with another virtual environment in the first physical location of the first user, and wherein the likely interference includes physical contact with the second user.

3. The method of claim 1, wherein the secondary virtual environment includes a virtual person unlocking a virtual door to a new space that was previously not visible.

4. The method of claim 1, wherein the secondary virtual environment is a virtual barrier, the virtual barrier including one or more of virtual caution tape, a virtual caution sign, and a virtual person giving verbal instructions.

5. The method of claim 1, wherein the rendering the secondary virtual environment further comprises:
   ending, in response to the first user being at the new physical location, the secondary virtual environment.

6. The method of claim 1, wherein the likely interference includes an audible interference, the method further comprising:
   predicting a future audible action to be performed by the first user; and
   determining the future audible action can be heard by the second user.

7. The method of claim 6, wherein the preventing the likely interference includes:
   determining the second virtual system includes a sound cancellation; and
   enabling the sound cancellation.

8. The method of claim 6, wherein the preventing the likely interference includes:
   prompting the first user to move to a second physical location; and
   determining, the future audible action cannot be heard by the second user from the second physical location.

9. The method of claim 1 wherein the predicting the future movement of the first user is based on one or more of, the task, a history for the first user, and a virtual environment associated with the first VR system.

10. The method of claim 9, wherein the predicting the future movement of the first user is performed by a learning model.

11. The method of claim 9, wherein identifying the first physical space includes identifying objects in the first physical location and wherein the predicting the future movement of the first user is based on one or more internet of things (IoT) devices associated with the first user.

12. The method of claim 1, wherein determining the likely interference is based on a risk score being above a predefined threshold.

13. A system comprising:
   a processor;
   a first virtual reality (VR) system associated with a first user and a second VR system associated with a second user, wherein the first user and the second user are co-located in a common physical space; and
   a computer-readable storage medium communicatively coupled to the processor and storing program instructions which, when executed by the processor, are configured to cause the processor to:
   predict a future movement of the first user to perform a first task in a primary virtual environment;
   predict a future audible action of the first user to perform the first task;
   identify, in response to the predicting the future movement of the first user, a first area needed for the first user to complete the first task;
   determine an unwanted interaction will occur between the first user and the second user; and
   prevent the unwanted interaction, wherein the preventing includes rendering a secondary virtual environment configured to allow movement away from the unwanted interaction by prompting the first user to move to a new physical location.

14. The system of claim 13, wherein determining the unwanted interaction includes generating a path of travel by the second user required to accomplish another task associated with another virtual environment in the common physical space, and wherein the unwanted interaction includes physical contact between the first user and the second user.

15. The system of claim 14, wherein the determination of the unwanted interaction includes predicted audible action of the first user can be heard by the second user.

16. The system of claim 15, wherein the prompting the first user to move to the new physical location further comprises prompting the first user to move from a first physical location to the new physical location by one or more of unlocking a virtual door, rendering new space that was previous not visible, and a virtual person leading the first user to the new physical location.

17. A computer program product, the computer program product comprising a computer readable storage medium having program instructions embodied therewith, the program instructions executable by a processing unit to cause the processing unit to:
- identify a first user associated with a first virtual reality (VR) system and a second user associated with a second VR system;
- predict a future movement of the first user to perform a first task in a primary virtual environment;
- predict a future audible action of the first user to perform the first task;
- identify, in response to the prediction of the future movement of the first user, a first physical space needed for the first user;
- determine, in response to identifying the first physical space, an unwanted interaction in a first physical location of the first user;
- prevent the unwanted interaction, wherein the preventing includes rendering a secondary virtual environment configured to allow movement away from the unwanted interaction by prompting the first user to move to a new physical location.

18. The computer program product of claim 17, wherein the determination of the unwanted interaction includes predicted audible action of the first user can be heard by the second user.

19. The computer program product of claim of claim 18, wherein the second VR system does not include sound cancellation.

20. The computer program product of claim 19, wherein the prompting the first user to move to the new physical location further comprises prompting the first user to move from the first physical location to the new physical location by one or more of unlocking a virtual door, rendering new space that was previous not visible, and a virtual person leading the first user to the new physical location.

* * * * *